UNITED STATES PATENT OFFICE 2,456,509

MANUFACTURE OF HYDROGEN FLUORIDE

Abner C. Hopkins, Jr., Hempstead, and Richard M. Stephenson, Long Island City, N. Y., and William E. Watson, West Orange, N. J., assignors to Allied Chemical & Dye Corporation, a corporation of New York No Drawing. Application October 6, 1944, Serial No. 557,548

4 Claims. (Cl. 23—153)

This invention relates to improvements in the separation and recovery of hydrogen fluoride from crude HF gases, particularly those contaminated with silicon fluoride. The invention is directed especially to manufacture of substantially pure anhydrous hydrogen fluoride.

In the production of crude hydrogen fluoride gases by reaction of fluorspar and sulfuric acid, the HF exit gases of the reaction furnace also contain variable quantities of inert diluents such as air and some $CO_2$, relatively small amounts of water vapor and $SO_2$, and usually quite substantial quantities of $SiF_4$ derived from silica impurity in the fluorspar. In manufacture of concentrated hydrofluoric acid and particularly in processes for making anhydrous hydrogen fluoride, removal of $SiF_4$ from the system has presented substantial operating problems.

According to one type of prior art procedure, the crude furnace gases are preliminarily cooled to condense out as much water as possible, and then the gases are refrigerated to condense HF in the form of strong hydrofluoric acid in which $SiF_4$ is relatively insoluble, at least a major part of the $SiF_4$ being discharged from the system in the tail gases exiting the refrigerating step. When the crude HF gases are diluted with substantial amount of air or when the quantity of $SiF_4$ in the gas is large as compared with the HF content, this mode of operation is not satisfactory, because the high vapor pressure of HF even with refrigeration at low temperature causes large quantities of HF to pass thru out of the system with the tail gas.

It has also been suggested to pass crude HF gas in contact with cold sulfuric acid whereby HF is dissolved out of the gas stream and separated from $SiF_4$ and other constituents contained in the impure gas, the sulfuric acid absorbing agent being subsequently heated to strip out HF. Such a procedure involves the disadvantages of working with sulfuric acid at temperatures and under conditions conducive to corrosion, and furthermore sulfuric acid holds tenaciously to substantial quantities of HF with the result that at reasonable heating temperatures stripability of HF from the sulfuric acid absorbing agent is poor.

The principal object of the present invention lies in the provision of a simply controlled and operated process for separating and recovering hydrogen fluoride out of crude HF gases, especially those contaminated with substantial quantities of silicon fluoride. The invention aims to provide an absorbing medium by the use of which it is possible to effectively separate HF from $SiF_4$ and other constituents contained in crude HF gases, to obtain efficient stripping of HF from the absorbing medium, and to carry out the entire operation in inexpensive equipment made of ordinary mild steel.

We have found that fluosulfonic acid ($HSO_3F$), maintained at suitable temperature, selectively absorbs HF out of a gas mixture containing $SiF_4$ and other constituents such as those normally present in crude hydrogen fluoride gases. We have discovered that by utilization of fluosulfonic acid as an absorbing medium it is possible, at temperatures of the order of 30–40° C., to substantially completely absorb HF out of a gas containing the same and form fluosulfonic acid liquor containing up to 50% by weight of free HF. Also, we find that such HF is lightly held and may be readily and completely stripped out of the fluosulfonic acid by heating to the moderate temperature of 164° C. (the boiling point of fluosulfonic acid). Our work also shows that at the absorbing temperatures indicated solubility of $SiF_4$ in the absorbing medium is practically nil.

The invention involves contacting a gas containing HF and $SiF_4$ with fluosulfonic acid while maintaining suitably low temperature conditions in the contacting zone whereby hydrogen fluoride is absorbed out of the gas stream and separated from $SiF_4$ and other constitutents of the gas stream which are discharged from the system as tail gas of the absorbing operation, subsequently stripping HF out of the fluosulfonic acid absorbing medium as by heating, and then recovering HF in pure condition and if desired in the form of anhydrous liquid hydrogen fluoride.

The process of the invention is capable of handling any impure gas containing HF and particularly $SiF_4$, regardless of the source of such gas. One practical application of the invention lies in the separation and recovery of HF from crude HF gases produced by reaction of sulfuric acid and fluorspar as known in the art relating to manufacture of aqueous hydrofluoric acid or substantially anhydrous hydrogen fluoride. Typical gases of this nature may contain, by volume, from 40 to 80% HF, from 2 to 15% $SiF_4$, a small amount of $SO_2$, possibly some $CO_2$, and water vapor depending upon the moisture content of the fluorspar and the strength of the acid used in the fluorspar-sulfuric acid reaction zone. Since water and fluosulfonic acid react to form HF and $H_2SO_4$, in practice of the present process it is preferred to utilize substantially dry HF gases. Crude hydrogen fluoride gases containing substantially no water may be made for example by utilizing in the fluorspar-sulfuric acid reaction zone a sufficient quantity of oleum of strength and amount sufficient to form 100% $H_2SO_4$ with all $H_2O$ brought into the system, i. e. as moisture in the fluorspar or as water content of any sulfuric acid used which may be of strength less than 100%.

Crude gases exiting the fluorspar furnace are usually at temperature of 100–150° C. and may be filtered if desired to remove suspended dust and mist. In the practice of the present invention, these gases are usually cooled down to approximately room temperature and are then fed into contact with fluosulfonic acid in any suitable gas-liquor contacting apparatus. For example, the cooled crude HF gas may be introduced into the bottom of an absorption tower into the top of which fluosulfonic acid is fed thru a spray distributor. The absorbing tower may be unobstructed or packed as in the known liquor-gas contacting art, and if desired a plurality of towers may be used and absorption carried out on the counter-current principle.

Temperature conditions maintained during the contacting operation may be anything such as to hold the partial pressure of HF over the fluosulfonic acid in the absorbing zone to a point less than the partial presure of HF in the incoming crude HF gas stream. Preferably, temperatures in the absorbing zone are maintained in the neighborhood of 30° C. and ordinarily not higher than 40° C. Absorption of HF by the fluosulfonic acid develops some heat and the resulting temperature increase may be offset by adequate cooling of the fluosulfonic acid during absorption or prior to introduction of the fluosulfonic acid into the tower. The absorption operation may be countercurrent, and the quantity of fluosulfonic acid fed into the tower, and rates of flow of gas and liquor are controlled so as to provide for substantially complete absorption of HF out of the gas stream. In order to permit carrying out the absorbing operation at temperatures in the general range of 30–400° C., and to avoid uneconomical cooling of the fluosulfonic acid fed into the top of the tower and still accomplish substantially complete absorption of HF, the quantity of fluosulfonic acid charged into the top of the tower may be regulated so that the liquid effluent of the tower contains from say 5 to 50% by weight of free HF. Under the absorbing temperatures and conditions indicated solubility of $SiF_4$ in the fluosulfonic acid is substantially nil, and $SiF_4$ and other constituents such as $SO_2$, $CO_2$ and air carried in the gas stream exit the top of the tower and are discharged from the system as tail gas.

The HF dissolved in the fluosulfonic acid effluent of the absorbing zone may be recovered in any suitable way, e. g. by heating or reduction of pressure, or a combination of both.

Preferably the absorption zone effluent is fed into the mid-section of a reflux column the bottom of which is equipped with a heating or boiling pot provided with suitable means for heating, and arranged so that liquor runs out of the bottom of the reflux column into the boiling pot while gases and vapors generated in the boiling pot are conducted back into the bottom of the column. Assuming equal pressures, temperatures maintained in the heating pot may be anything substantially in excess of temperature at which the absorption zone is operated. Fluosulfonic acid boils at 164° C. We find that if supply of heat to the boiling pot is such as to maintain the liquor therein at temperature of say 160–164° C., i. e. substantially at the boiling point of fluosulfonic acid, it is possible to completely strip HF from the fluosulfonic acid.

Vapors and gases fed into the bottom of the reflux tower pass upwardly countercurrent to downflow of incoming fluosulfonic acid containing absorbed HF. With a suitably designed column, upwards of about 95% of volatilized fluosulfonic acid is recondensed and runs back into the boiling pot. Vapor discharged from the top of the reflux column at temperature of e. g. 30–40° C. is hydrogen fluoride containing comparatively small amount of fluosulfonic acid as an impurity. If substantially pure hydrogen fluoride product is desired, the exit vapor of the reflux column may be fed into the bottom of a second reflux column arranged so that liquor discharged from the bottom of the second column runs back into the top of the first column and so that the vapors exiting the top of the second column enter a condenser in which the HF vapors are cooled to appreciably less than 19° C. in order to liquefy the hydrogen fluoride. A suitable small quantity of liquid hydrogen fluoride may be run back into the top of the second column for refluxing purposes. By this procedure, the liquid product discharged from the condenser is substantially pure anhydrous hydrogen fluoride.

Certain work carried out in connection with the development of the invention showed the following absorption and stripping properties of HF in fluosulfonic acid at absorbing and stripping temperatures, and comparative data relative to sulfuric acid:

| Temp., °C. | Per cent HF in 100% $HSO_3F$ | Per cent HF in 98–100% $H_2SO_4$ |
|---|---|---|
| 30 | 50 | 33.7 |
| 40 | 30 | 28.5 |
| 100 | 2.4 | 11.3 |
| 120 | 1.4 | |
| 130 | | 4.7 |
| 140 | 0.4–0.7 | 3.4 |
| 150 | | 2.6 |

The invention affords the marked advantages that HF stripping may be substantially complete if desired and that temperatures nowhere in the system are higher than 164° C. Since we have found fluosulfonic acid is substantially non-corrosive to steel at such temperature, the equipment employed in the absorbing and stripping system may be made of low-priced ordinary mild steel. In usual operation, the effluent of the boiling pot is cooled to around 25–35° C. and returned to the top of the absorbing tower for reuse in a succeeding cycle.

While it is preferred to employ substantially dry crude HF gases, it is possible to operate with gases containing moisture. As previously indicated, water and fluosulfonic acid react to form $H_2SO_4$ and HF. Hence, if the incoming gases being handled contain water, in the absorption zone incoming water is chemically converted to a corresponding amount of $H_2SO_4$, and the absorption liquor remains anhydrous. This feature constitutes no particular disadvantage since, in the stripping step, temperatures in the boiling pot and refluxing zone or zones do not exceed 164° C. at which temperature there is substantially no measurable volatilization of sulfuric acid. Furthermore, the quantity of sulfuric acid present is so small that in the presence of a large amount of fluosulfonic acid the sulfuric acid has no perceptible corrosive effect on the apparatus. In this situation, the total $H_2SO_4$ content builds up on repeated circulation of the absorbing liquor thru the system. To provide for this circumstance, it is only necessary from time to time to bleed out of the system a small portion of the liquor effluent of the boiling pot, and the quantity of $SO_3$ thus taken out of the absorbing and stripping circuit may be made up by introducing into the absorbing zone $SO_3$ or high strength (e. g. 65–85%) oleum in amount sufficient to offset the quantity of $SO_3$ contained in the bleed-off. The $H_2SO_4$ contaminated fluosulfonic acid taken out of the absorbing and stripping system may be utilized in making up the mix fed into the fluorspar-sulfuric acid furnace. If desired, the fluosulfonic acid in the liquid bled out of the system may be recovered by distillation from the sulfuric acid impurity. By operating in this way the fluosulfonic acid make-up to the system may be considerably reduced.

We claim:

1. The process for separating hydrogen fluoride from silicon fluoride which comprises contacting a gas mixture containing HF and $SiF_4$ with a substantially anhydrous absorbing liquor consisting essentially of fluosulfonic acid which contains not more than a minor contaminating amount of sulfuric acid, and carrying out said contacting operation under temperature conditions low enough to effect absorption of HF in said liquor, whereby HF is absorbed by said liquor, the absorbing liquor is maintained in a substantially anhydrous condition, and gaseous $SiF_4$ is discharged from said contacting operation.

2. The process for separating hydrogen fluoride from silicon fluoride which comprises contacting a gas mixture containing HF and $SiF_4$ with a substantially anhydrous absorbing liquor consisting essentially of fluosulfonic acid which contains not more than a minor contaminating amount of sulfuric acid, carrying out said contacting operation under temperature conditions low enough to effect absorption of HF in said liquor, whereby HF is absorbed by said liquor, the absorbing liquor is maintained in a substantially anhydrous condition, and gaseous $SiF_4$ is discharged from said contacting operation and recovering hydrogen fluoride from said liquor.

3. The process for separating hydrogen fluoride from silicon fluoride which comprises contacting a gas mixture containing HF and $SiF_4$ with a substantially anhydrous absorbing liquor consisting essentially of fluosulfonic acid which contains not more than a minor contaminating amount of sulfuric acid carrying, out said contacting operation at temperature not higher than 40° C., whereby HF is absorbed by said liquor, the absorbing liquor is maintained in a substantially anhydrous condition, and gaseous $SiF_4$ is discharged from said contacting operation, thereafter heating said liquor to temperature high enough to strip HF out of said liquor, and recovering such hydrogen fluoride.

4. The process for making substantially pure anhydrous hydrogen fluoride comprising contacting a substantially dry gas mixture containing HF and $SiF_4$ with a substantially anhydrous absorbing liquor consisting essentially of fluosulfonic acid which contains not more than a minor contaminating amount of sulfuric acid, carrying out said contacting operation at temperature not higher than 40° C., whereby HF is absorbed by said liquor, the absorbing liquor is maintained in substantially anhydrous condition, and gaseous $SiF_4$ is discharged from said contacting operation, thereafter heating said liquor to temperature of the order of 160–164° C. to thereby strip HF out of said liquor, and recovering substantially pure anhydrous hydrogen fluoride in liquid condition.

ABNER C. HOPKINS, JR.
RICHARD M. STEPHENSON.
WILLIAM E. WATSON.

REFERENCES CITED

The following references are of record in the file of this patent:

FOREIGN PATENTS

| Number | Country | Date |
| --- | --- | --- |
| 387,614 | Great Britain | Feb. 9, 1933 |

OTHER REFERENCES

Mellor, Inorganic and Theoretical Chemistry, vol. 10, page 684. Pub. by Longmans, Green and Co., London, (1930).